US008037350B1

(12) United States Patent
Aggarwal et al.

(10) Patent No.: US 8,037,350 B1
(45) Date of Patent: Oct. 11, 2011

(54) ALTERING A DEGREE OF REDUNDANCY USED DURING EXECUTION OF AN APPLICATION

(75) Inventors: Nidhi Aggarwal, Sunnyvale, CA (US); Norman Paul Jouppi, Palo Alto, CA (US); Parthasararthy Ranganathan, Fremont, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 296 days.

(21) Appl. No.: 12/250,367

(22) Filed: Oct. 13, 2008

Related U.S. Application Data

(60) Provisional application No. 61/049,141, filed on Apr. 30, 2008.

(51) Int. Cl.
*G06F 11/00* (2006.01)
(52) U.S. Cl. .............................. 714/11; 714/10; 718/105
(58) Field of Classification Search .............. 714/10–12, 714/43; 718/105; 712/43
See application file for complete search history.

(56) References Cited

U.S. PATENT DOCUMENTS

| | | | | |
|---|---|---|---|---|
| 6,182,206 | B1 * | 1/2001 | Baxter | 712/43 |
| 6,615,366 | B1 * | 9/2003 | Grochowski et al. | 714/10 |
| 6,640,313 | B1 * | 10/2003 | Quach | 714/10 |
| 6,961,842 | B2 * | 11/2005 | Baxter | 712/43 |
| 7,017,073 | B2 * | 3/2006 | Nair et al. | 714/11 |
| 7,194,671 | B2 * | 3/2007 | Tu et al. | 714/744 |
| 7,287,185 | B2 * | 10/2007 | Safford et al. | 714/11 |
| 7,328,371 | B1 * | 2/2008 | Kalyanasundharam et al. | 714/11 |
| 7,549,145 | B2 * | 6/2009 | Aguilar et al. | 717/149 |
| 7,669,079 | B2 * | 2/2010 | Weiberle et al. | 714/10 |
| 7,788,670 | B2 * | 8/2010 | Bodas et al. | 718/105 |
| 2002/0073357 | A1 * | 6/2002 | Dhong et al. | 714/19 |
| 2004/0019771 | A1 * | 1/2004 | Quach | 712/229 |
| 2004/0123201 | A1 * | 6/2004 | Nguyen et al. | 714/736 |
| 2004/0260910 | A1 * | 12/2004 | Watt et al. | 712/43 |
| 2006/0053424 | A1 * | 3/2006 | Koistinen et al. | 718/105 |
| 2006/0212677 | A1 * | 9/2006 | Fossum | 712/1 |
| 2007/0022348 | A1 * | 1/2007 | Racunas et al. | 714/735 |
| 2007/0282967 | A1 * | 12/2007 | Fineberg et al. | 709/214 |
| 2008/0091974 | A1 * | 4/2008 | Nakashima | 714/10 |
| 2008/0109816 | A1 * | 5/2008 | Arimilli et al. | 718/105 |
| 2008/0209176 | A1 * | 8/2008 | Singh et al. | 712/214 |
| 2008/0263324 | A1 * | 10/2008 | Sutardja et al. | 712/43 |
| 2008/0301695 | A1 * | 12/2008 | Aguilar et al. | 718/105 |
| 2009/0119540 | A1 * | 5/2009 | Weiberle et al. | 714/10 |
| 2009/0172229 | A1 * | 7/2009 | Zmudzinski | 710/260 |
| 2009/0309243 | A1 * | 12/2009 | Carmack et al. | 257/798 |

OTHER PUBLICATIONS

U.S. Appl. No. 11/787,881, filed Apr. 17, 2007, Aggarwal et al.
Aggarwal, Nidhi et al. "Configurable Isolation: Building High Availability Systems with Commodity Multi-Core Processors"; ISCA '07, Jun. 9-13, 2007.

(Continued)

*Primary Examiner* — Yolanda L Wilson

(57) ABSTRACT

Processor operating methods and integrated circuits are described. According to one embodiment, a processor operating method includes executing an application using a first number of a plurality of processor cores. The method also includes, during the executing using the first number, evaluating a transition criterion and after the evaluating, executing the application using a second number of the plurality of processor cores. According to another embodiment, an integrated circuit includes a plurality of processor cores and processing circuitry. The processing circuitry is configured to configure a first number of the plurality of processor cores to execute an application, evaluate a transition criterion, and, in response to evaluating the transition criterion, configure a second number of the plurality of processor cores to execute the application. Additional embodiments are described in the disclosure.

19 Claims, 7 Drawing Sheets

OTHER PUBLICATIONS

Aggarwal, Nidhi et al. "Reconfiguration in a Multi-Core Processor System with Configurable Isolation"; U.S. Provisional Patent Application.

Aggarwal, Nidhi et al. "Processor Operating Methods and Integated Circuits"; US Patent Application.

Bernick David et al. "NonStop Advanced Architecture"; Proceedings of the 2005 International Conference on Dependable Systems and Networks (DSN '05), 2005 IEEE.

Bressoud, Thomas C. and Schneider, Fred B. "Hypervisor-Based Fault-Tolerance"; ACM Transactions on Computer Systems, vol. 14, No. 1 Feb. 1996, pp. 80-107.

Gold, Brian T. et al. "Truss: A Reliable, Scalable Server Architecture," IEEE Nov./Dec. 2005 pp. 51-59.

Gomaa, M. et al., "Transient-Fault Recovery for Chip Multiprocessors," International Symposium on Computer Architecture, 2003.

Kumar, Rakesh et al, "Single-ISA Heterogeneous Multi-Core Architectures for Multithreaded Workload Performance"; In Proceedings of the 31st International Symposium on Computer Architecture, Jun. 2004.

Srinivasan, Jayanth et al. "The Impact of Technology Scaling on Lifetime Reliability"; Proceedings of "The International Conference on Dependable Systems and Networks (DSN-04)," Jun. 2004.

U.S. Appl. No. 11/787,881, Inventor: Aggarwal, Nidhi et al., filed Apr. 17, 2007.

* cited by examiner

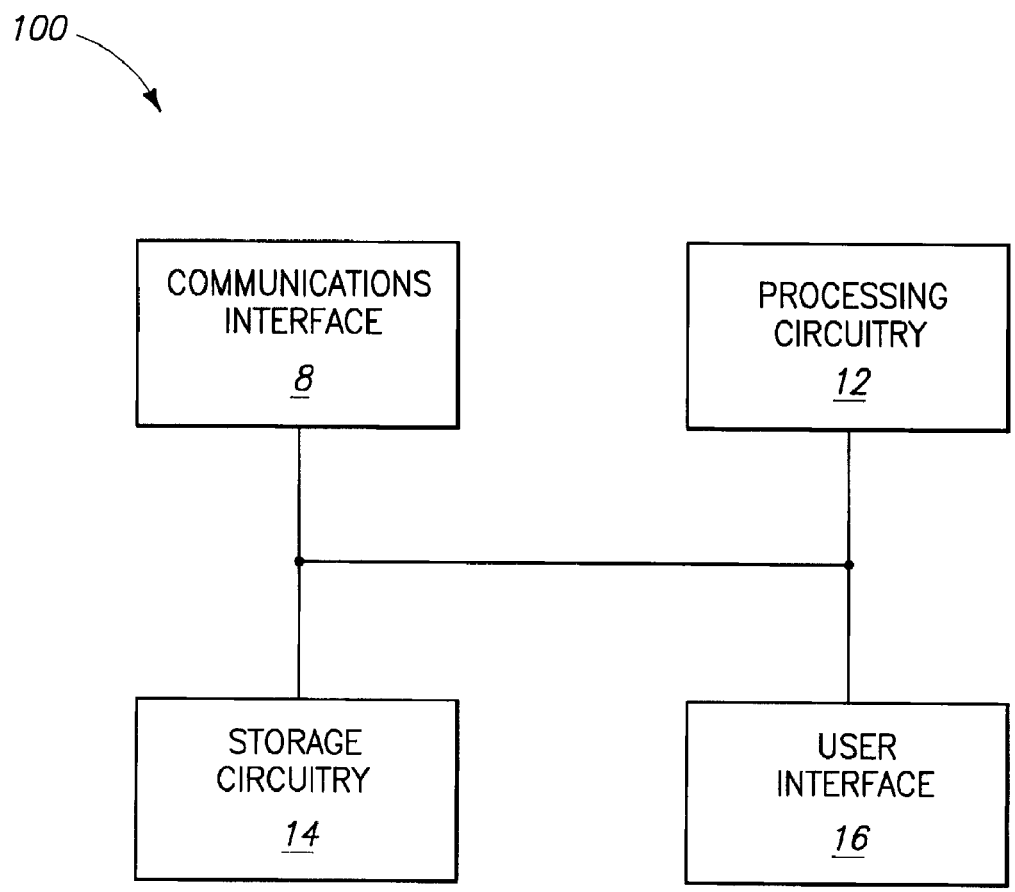

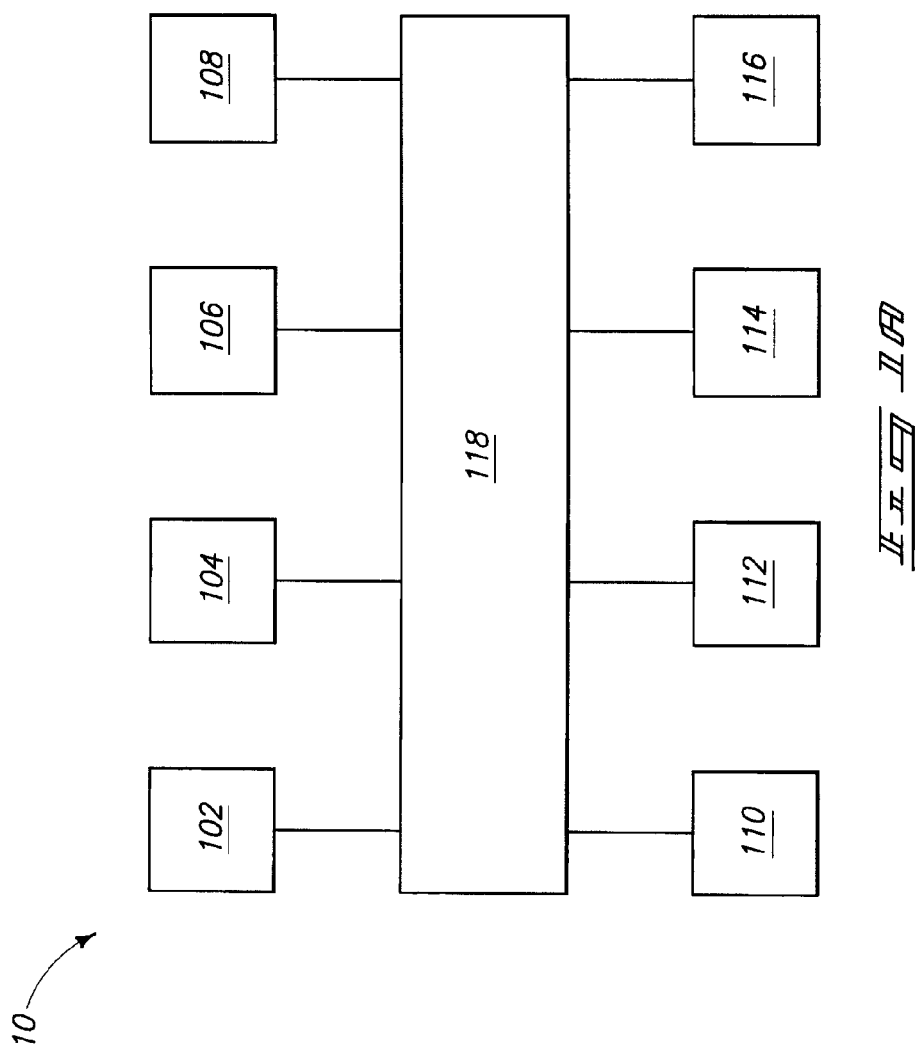

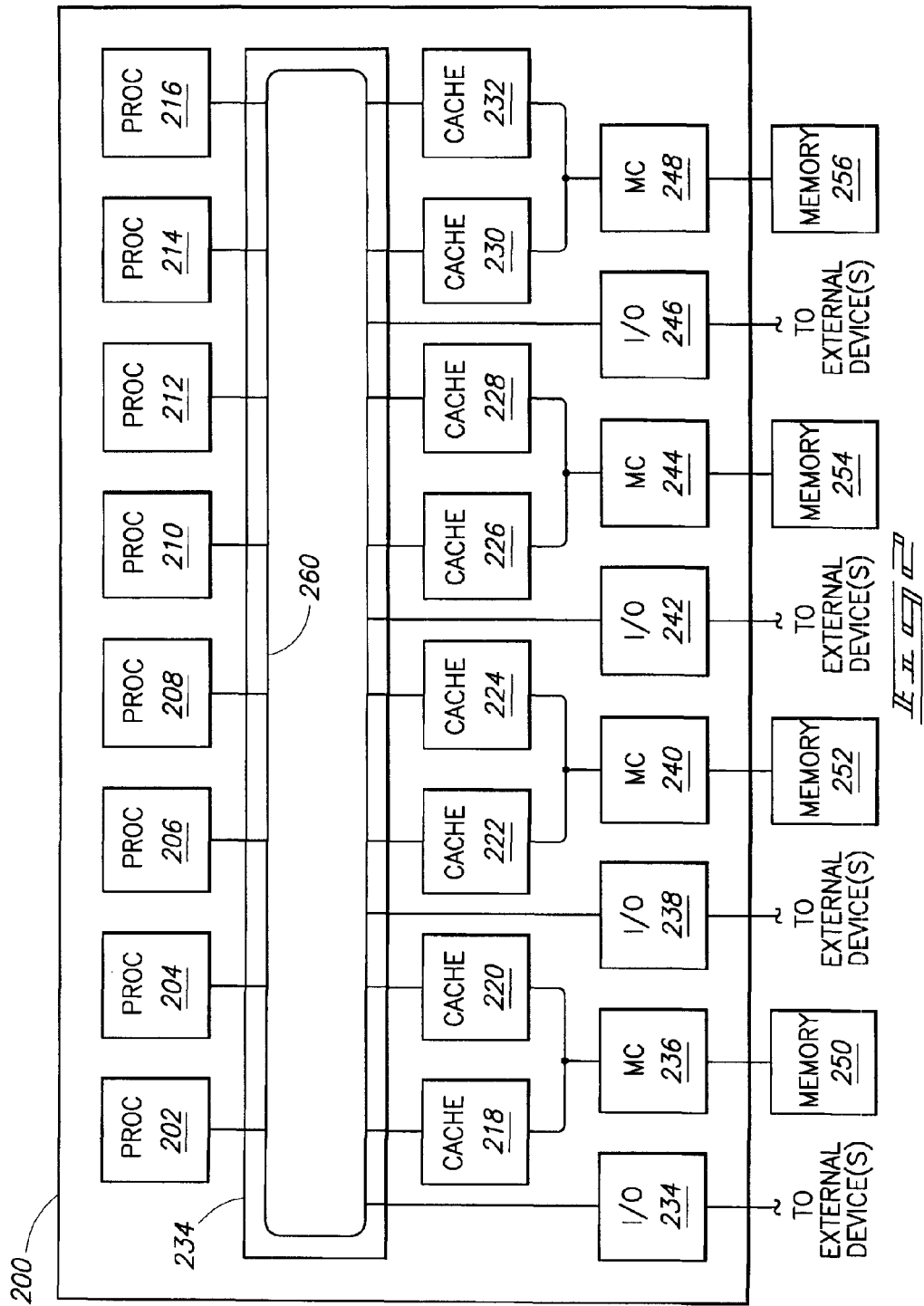

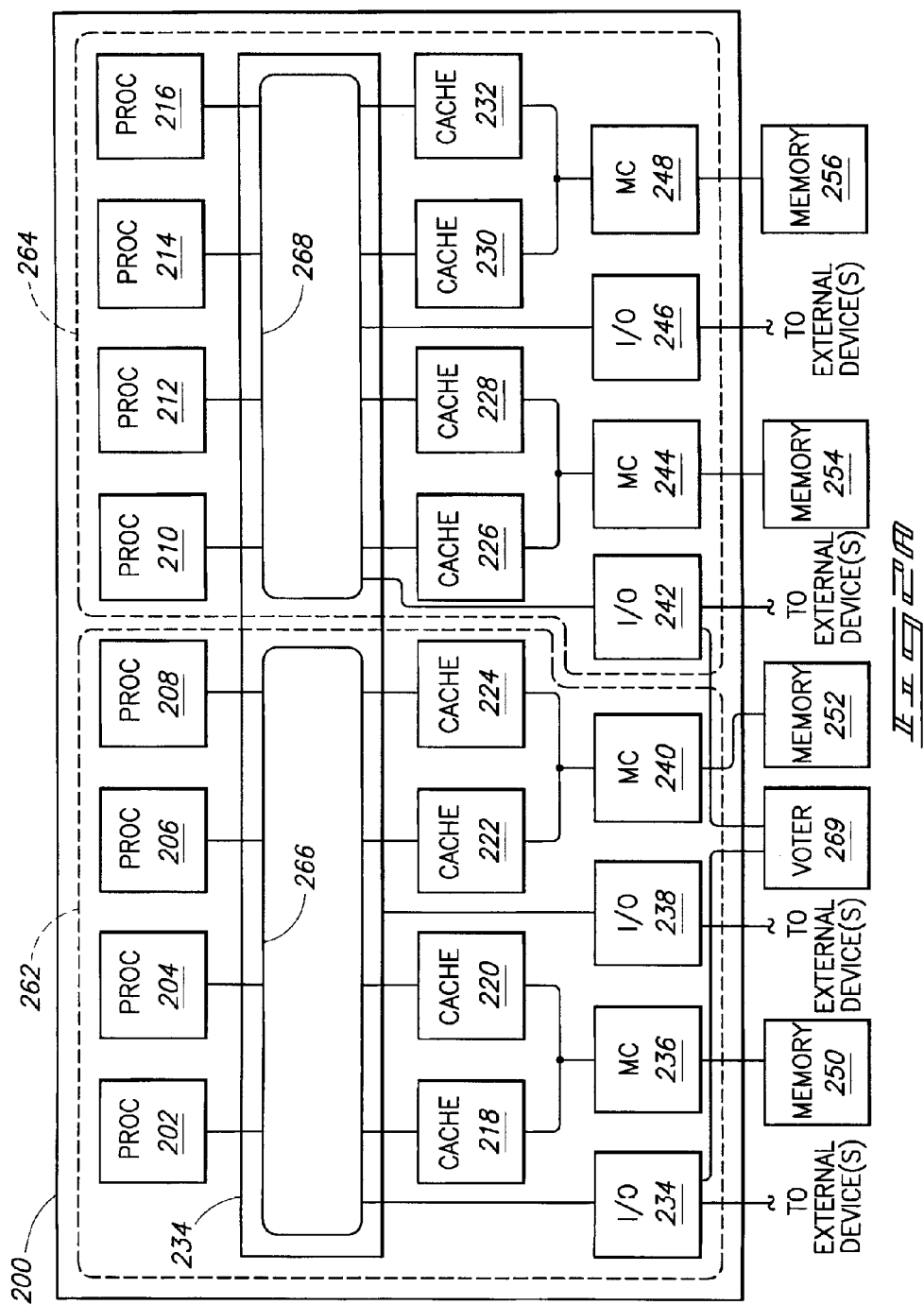

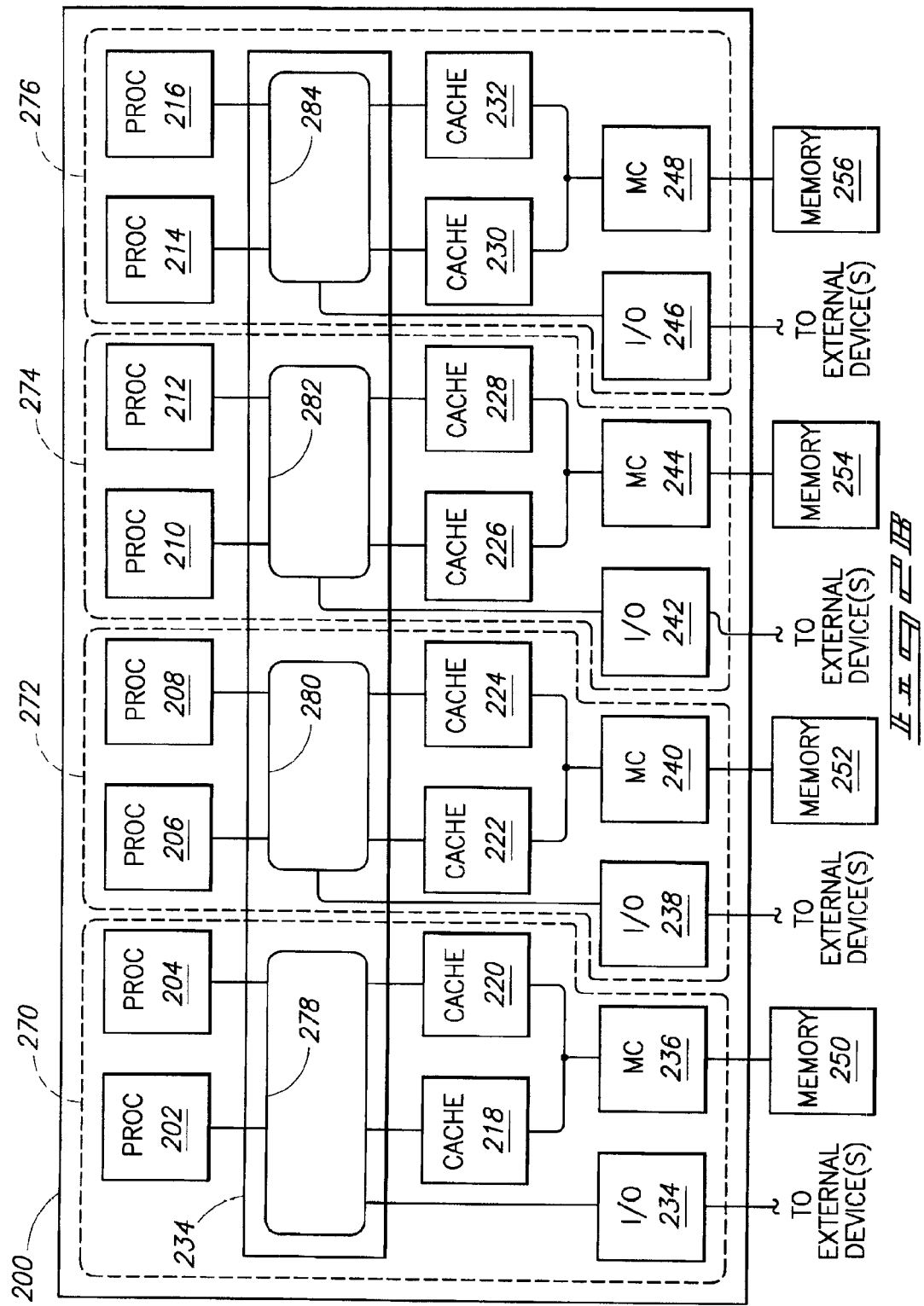

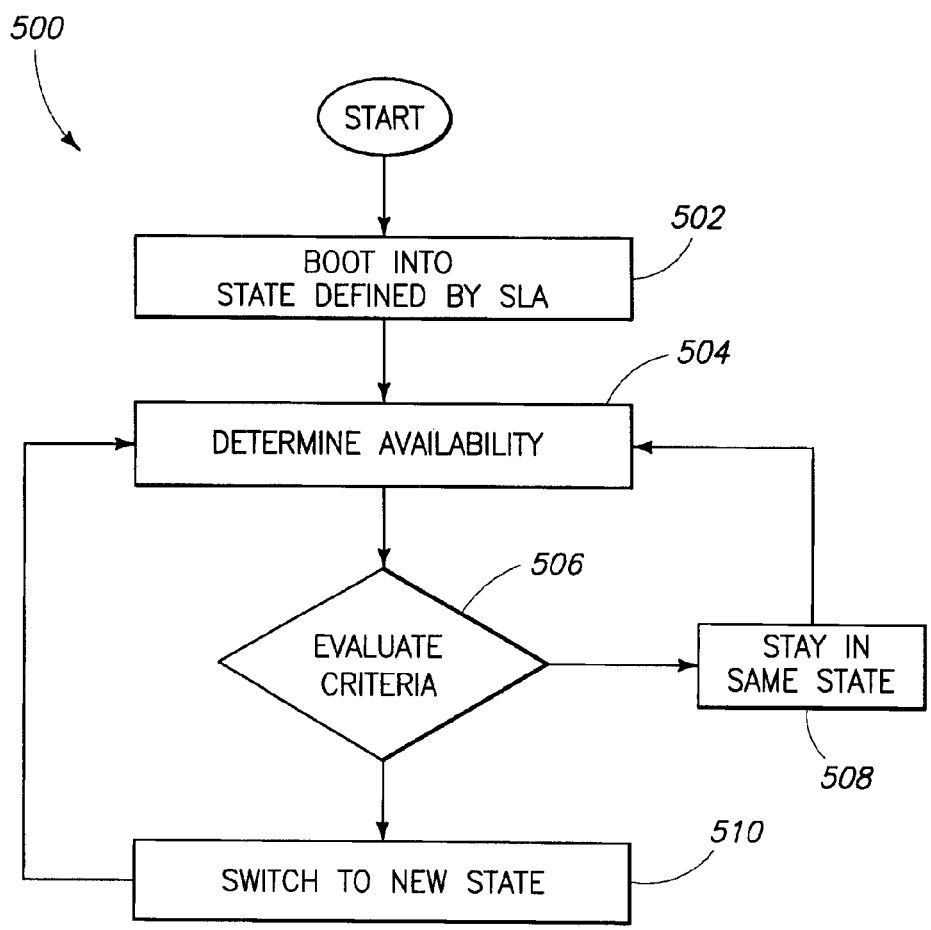

ALTERING A DEGREE OF REDUNDANCY USED DURING EXECUTION OF AN APPLICATION

CROSS-REFERENCE TO RELATED APPLICATIONS

This patent application claims the benefit of priority under 35 U.S.C. §119(e) to U.S. Provisional patent application Ser. No. 61/049,141, filed Apr. 30, 2008, entitled "Altering A Degree Of Redundancy Used During Execution Of An Application," having the same inventors and which is hereby incorporated by reference in its entirety.

FIELD OF THE DISCLOSURE

Aspects of the disclosure relate to altering a degree of redundancy used during execution of an application.

BACKGROUND OF THE DISCLOSURE

Monolithic integrated circuit chips may include more than one processor core. Such chips may be referred to as chip multiprocessors. Chip multiprocessors may use one processor core of the chip multiprocessor to execute instructions of a first application and may simultaneously use another processor core of the chip multiprocessor to execute instructions of a second application. Doing so may reduce an amount of time used to execute the instructions of the first and second applications when compared to a chip having a single processor core that multiplexes execution of instructions of both the first and second applications.

SUMMARY

According to some aspects of the disclosure, methods and integrated circuits for altering a degree of redundancy used during execution of an application are described.

According to one embodiment, a processor operating method includes executing an application using a first number of a plurality of processor cores, during the executing using the first number evaluating a transition criterion, and after the evaluating executing the application using a second number of the plurality of processor cores.

According to another embodiment, a processor operating method includes performing a single execution of an application, the application comprising a plurality of instructions. The method also includes, during the performing of the single execution of the application, non-redundantly executing a first subset of the instructions of the plurality and executing a second subset of the instructions of the plurality a first time. The method also includes, during the performing of the single execution of the application, redundantly executing the second subset of the instructions of the plurality a second time and comparing results of the executing of the second subset the first time with results of the executing of the second subset the second time.

According to another embodiment, an integrated circuit includes a plurality of processor cores and processing circuitry. The processing circuitry is configured to configure a first number of the plurality of processor cores to execute an application, evaluate a transition criterion, and, in response to evaluating the transition criterion, configure a second number of the plurality of processor cores to execute the application.

Other embodiments are described as is apparent from the following discussion.

DESCRIPTION OF THE DRAWINGS

FIG. 1 is a block diagram of a computer according to one embodiment.

FIG. 1A is a block diagram of a processor according to one embodiment.

FIG. 2 is a block diagram of a processor according to one embodiment.

FIG. 2A is a block diagram of a processor according to one embodiment.

FIG. 2B is a block diagram of a processor according to one embodiment.

FIG. 5 is a flow chart according to one embodiment.

DETAILED DESCRIPTION

Figure 3:
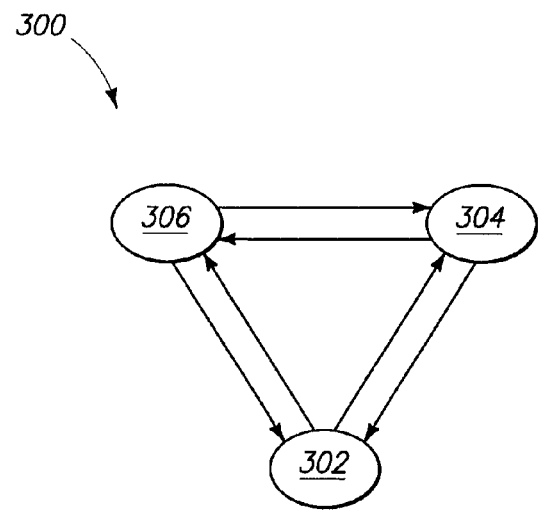
FIG. 3 is a state diagram according to one embodiment.

Attention is directed to the following commonly assigned applications, which are incorporated herein by reference: U.S. Patent Application No. 61/049,173 entitled "Reconfiguration in a Multi-Core Processor System with Configurable Isolation" naming Nidhi Aggarwal, Norman Paul Jouppi, and Parthasarathy Ranganathan as inventors, which is incorporated herein by reference; U.S. Patent Application No. 61/049,151 entitled "Selective Availability in Processor Systems" naming Nidhi Aggarwal, Norman Paul Jouppi, and Parthasarathy Ranganathan as inventors, which is incorporated herein by reference; and U.S. patent application Ser. No. 11/787,881 entitled "Chip Multiprocessor with Configurable Fault Isolation" naming Nidhi Aggarwal, Norman Paul Jouppi, and Parthasarathy Ranganathan as inventors which is incorporated herein by reference.

The present disclosure is directed towards computers, processors, and methods of operating or configuring processors in example embodiments. According to some aspects of the disclosure, integrated circuits and processor operating methods execute an application using varying degrees of redundancy. The degree of redundancy used in executing the application may be changed in response to evaluating one or more transition criteria.

The transition criterion may be related to the application itself. For example, the transition criterion may be related to a delay sensitivity characteristic of the application, an error sensitivity characteristic of the application, an availability requirement of a service level agreement (SLA) associated with the application, or a time of execution characteristic of the application in some illustrative embodiments.

The transition criterion may alternatively be related to a plurality of processor cores executing the application. For example, the transition criterion may be related to a load characteristic of one or more of the processor cores, an ambient error rate of one or more of the processor cores, an availability of one or more of the processor cores, or a power configuration of one or more of the processor cores.

Referring to FIG. 1, a computer 100 is illustrated. Computer 100 includes a communications interface 8, processing circuitry 12, storage circuitry 14, and a user interface 16.

Communications interface 8 may enable computer 100 to communicate with other devices (e.g., other computers). For example, communications interface 8 may be a network interface.

Processing circuitry 12 may comprise circuitry configured to implement desired programming provided by appropriate media in at least one embodiment. For example, processing circuitry 12 may be implemented as one or more of a processor and/or other structure configured to execute executable instructions including, for example, software and/or firmware instructions, and/or hardware circuitry. Exemplary embodiments of processing circuitry 12 include hardware logic, PGA, FPGA, ASIC, state machines, and/or other structures alone or in combination with a processor. These examples of processing circuitry 12 are for illustration and other configurations are possible.

In one specific example, a processor of processing circuitry 12 may include a plurality of modules that may perform the same and/or different functions of the processor. For example, the modules may include a processor core module which processes data (e.g., executes instructions), a cache memory module which stores data used by a processor core module, a memory controller module which facilitates an exchange of data between a cache memory module and an external memory device, and an input/output (I/O) controller module which enables a processor core module to communicate with other devices. In one more specific example embodiment, the processor is a multiprocessor, which includes a plurality of the same type of modules (e.g., processor core modules). In another example, only one type of a module is present in the processor.

Furthermore, the processor may take a number of different physical forms. In one embodiment, the processor may be a single monolithic integrated circuit chip. The single monolithic integrated circuit chip may include one or more processor cores. In some embodiments, if the single monolithic integrated circuit chip includes more than one processor core, the integrated circuit may be referred to as a chip multiprocessor.

In another embodiment, the processor may include more than one integrated circuit chip. For example, the processor may include a plurality of integrated circuit chips and one or more of the integrated circuit chips of the plurality may include a plurality of processor cores.

In one embodiment, processing circuitry 12 may configure the processor to execute applications including operating systems and/or virtual machines. In fact, in one embodiment, the processor may execute more than one operating system or virtual machine. In doing so, processing circuitry 12 may act as a hypervisor and/or virtual machine monitor and may use hypervisor-based process pairing or other techniques. Alternatively or additionally, processing circuitry 12 may configure the processor to execute an application redundantly.

In one embodiment, processing circuitry 12 may monitor and/or configure the processor. The portions of processing circuitry 12 configured to monitor and/or configure the processor may be part of the processor itself and/or may be circuitry separate from the processor (e.g., a separate processor). In one embodiment, processing circuitry 12 may configure the processor to execute an application using a first degree of redundancy and later, while the application is being executed by the processor, configure the processor to execute the application using a second degree of redundancy. For example, during a single execution of an application (e.g., a single instantiation of the application or a single process instantiating the application), processing circuitry 12 may configure the processor to execute the application using a single processor core and no redundancy and may later, during the single execution of the application, configure the processor to redundantly execute the application, for example, using two processor cores.

Storage circuitry 14 may be embodied in a number of different ways using electronic, magnetic, optical, electromagnetic, or other techniques for storing information. Some specific examples of storage circuitry include, but are not limited to, a portable magnetic computer diskette, such as a floppy diskette, zip disk, hard drive, random access memory, read only memory, flash memory, cache memory, and/or other configurations capable of storing programming, data, or other digital information. In one embodiment, storage circuitry 14 may store programming implemented by processing circuitry 12.

At least some embodiments or aspects described herein may be implemented using programming stored within appropriate processor-usable media and configured to control appropriate processing circuitry. For example, programming may be provided via appropriate media including, for example, embodied within articles of manufacture.

User interface 16 is configured to interact with a user including conveying data to a user (e.g., displaying data for observation by the user, audibly communicating data to a user, etc.) as well as receiving inputs from the user (e.g., tactile input, voice instruction, etc.). Accordingly, in one exemplary embodiment, the user interface may include a display (e.g., cathode ray tube, LCD, etc.) configured to depict visual information and an audio system as well as a keyboard, mouse and/or other input device. Any other suitable apparatus for interacting with a user may also be utilized.

Referring to FIG. 1A, one embodiment of a processor 10 of processing circuitry 12 is illustrated. Processor 10 includes modules 102, 104, 106, 108, 110, 112, 114, and 116 and interconnection circuitry 118. As mentioned above, the modules of processor 10 may perform processor functions. For example, the modules of processor 10 may be processor cores, cache memories, memory controllers, or I/O controllers. Interconnection circuitry 118 may enable communication between the modules.

In one embodiment, module 102 may be a processor core and module 110 may be a cache memory. Accordingly, module 110 may store data and instructions and module 102 may retrieve the instructions from module 110 via interconnection circuitry 118 and may execute the instructions. In doing so, module 102 may retrieve data from module 110 via interconnection circuitry 118 and/or write data to module 110 via interconnection circuitry 118.

In one embodiment, the modules of processor 10 may be associated with each other in a particular way in order to communicate with each other. For example, module 102 may be associated with module 110 so that module 102 and module 110 may communicate with each other. Specifically, module 110 may store instructions and data and may provide the instructions and data to module 102. Module 102 may provide data to module 110. Similarly, in one embodiment, modules 104, 106, and 108 may be processor cores that are associated respectively with modules 112, 114, and 116, which may be cache memories.

In one embodiment, modules 102, 104, 106, and 108 may perform the same function (e.g., processing instructions) but may perform the function using different data. For example, modules 102 and 104 may both be processor cores that execute instructions but module 102 may execute different instructions than module 104. Similarly, modules 112, 114, 116, and 118 may perform the same function (e.g., storing data and instructions) but may perform the function using different data. For example, modules 110 and 112 may both be cache memories that store instructions and data, but module 110 may store different instructions and data than module 112.

In one embodiment, one or more of the modules of processor 10 may be a different integrated circuit chip and interconnection circuitry 118 may be a network or bus connecting the different chips together. In another embodiment, the modules of processor 10, as well as interconnection circuitry 118, may be included in a single monolithic integrated circuit chip.

Interconnection circuitry 118 may enable communication between the modules of processor 10. In one embodiment, interconnection circuitry 118 may enable each module of processor 10 to communicate with every other module of processor 10. In another embodiment, interconnection circuitry 118 may enable each module of processor 10 to communicate with some of the other modules of processor 10, but not all of the other modules of processor 10. In one embodiment, interconnection circuitry 118 may selectively enable communication between the modules of processor 10.

Processing circuitry 12 may control and/or configure the modules of processor 10 to execute applications. For example, processing circuitry 12 may configure each module of processor 10 to execute a different application. In one embodiment, processing circuitry 12 may initially configure one module of processor 10 to execute an application, for example, module 102. Later, processing circuitry 12 may determine that the application should be executed using redundancy. Accordingly, processing circuitry 12 may configure module 104 to execute the application in addition to module 102, perhaps during a single execution of the application. In one configuration, processing circuitry 12 may wait until module 102 reaches a checkpoint and may then configure modules 102 and 104 to begin executing the application from the checkpoint.

Processing circuitry 12 may frequently compare results of the execution of the application by module 102 with results of the execution of the application by module 104 to determine whether the results from the two modules are the same. The execution may proceed if the results are the same or are otherwise satisfactory. If the results are not the same, processing circuitry 12 may configure modules 102 and 104 to back up to a checkpoint and re-execute the application from the checkpoint. This configuration may be referred to as a dual mode redundant configuration.

It should be noted that modules 102 and 104, in one configuration, may be executing the same instance of the application and therefore may be executing substantially the same instructions. In another embodiment, modules 102 and 104 may each execute a different instance of the application where each instance may be executing the application based on different data.

Later, processing circuitry 12 may determine that the application should be executed using a different degree of redundancy. For example, processing circuitry 12 may determine that no redundancy is necessary and may therefore configure and/or control module 104 so that it no longer executes the application. Module 102, however, may continue to execute the application. Other degrees of redundancy are also possible. For example, processing circuitry 12 may determine that the application should be executed using triple mode redundancy and may therefore configure modules 102, 104, and 106 to execute the application.

Processing circuitry 12 may frequently compare results of the execution of the application by module 102 with results of the execution of the application by module 104 and results of the execution of the application by module 106 to determine whether the results from the three modules are the same. If all three results are not the same, but two of the results are the same, processing circuitry 12 may use the result that two of the modules agreed on. This technique may be referred to as forward error recovery. Consequently, the execution of the application need not be backed up to a checkpoint. As a result, using triple mode redundancy to execute an application may be faster than using dual mode redundancy to execute the application.

In one configuration, processor 10 may execute an application using redundancy but may use a single module. For example, processing circuitry 12 may configure module 102 to execute an application redundantly. In this configuration, module 102 may execute the application from a first checkpoint to a second checkpoint and store the results of the execution. Module 102 may then execute the application from the first checkpoint to the second checkpoint again and compare the result from this second execution of the application with the stored result from the first execution of the application. If the results agree, module 102 may then redundantly execute the application from the second checkpoint to a third checkpoint, from the third checkpoint to a fourth checkpoint, and so on. In this manner a single module, module 102, may redundantly execute the application.

In this configuration, processing circuitry 12 may alter the configuration of module 102 over time by altering the degree of redundancy performed by module 102. Accordingly, module 102 may redundantly execute portions of the application two or more times and may non-redundantly execute other portions of the application a single time.

In yet another configuration, module 102 may be capable of redundantly executing an application using dual pipelining. In this configuration, module 102 may include two pipelines and may use each of the two pipelines to redundantly execute instructions of an application within module 102. Some circuitry of module 102 may be shared by both pipelines, nevertheless, dual pipelining may provide some protection against errors. Consequently, processor 10 may redundantly execute the application using a single module, module 102, rather than using a plurality of the modules of processor 10.

In selecting a degree of redundancy with which to execute the application, processing circuitry 12 may use one or more transition criteria. Individual transition criterion, in one embodiment, may be related a characteristic of the application itself or to a characteristic of processor 10. Transition criteria will be discussed in more detail below.

Referring to FIG. 2, another embodiment of a processor is illustrated. In this embodiment, the processor is a single monolithic integrated circuit chip 200 having four different types of modules: processor cores, cache memories, memory controllers, and I/O controllers. Chip 200 includes eight processor cores 202, 204, 206, 208, 210, 212, 214, and 216 and eight cache memories 218, 220, 222, 224, 226, 228, 230, and 232. In addition, chip 200 includes four memory controllers 236, 240, 244, and 248 and four I/O controllers 234, 238, 242, and 246. Chip 200 also includes interconnection circuitry 234.

Four external memories 250, 252, 254, and 256 are also depicted in FIG. 2. External memories 250, 252, 254, 256 may store instructions that may be executed by the processing cores of chip 200 and may also store data associated with the execution of the instructions. External memories 250, 252, 254, and 256 may be physically distinct from chip 200 in one embodiment. In other words, external memories 250, 252, 254, and 256 may be implemented as one or more integrated circuit chips distinct from chip 200.

Memory controllers 236, 240, 244, and 248 may facilitate the transfer of data (e.g., data lines) between the cache memories of chip 200 and external memories 250, 252, 254, and 256. In one embodiment, one memory controller may be shared by two of the cache memories of chip 200. For example, memory controller 236 may communicate both with cache memory 218 and cache memory 220.

Cache memories 218, 220, 222, 224, 226, 228, 230, and 232 may store data and instructions retrieved from external memories 250, 252, 254, and 256 via memory controllers 236, 240, 244, and 248. In addition, the cache memories of chip 200 may store data received from the processor cores of chip 200. Memory controllers 236, 240, 244, and 248 may subsequently store the data received from the processor cores of chip 200 in external memories 250, 252, 254, and 256.

Processor cores 202, 204, 206, 208, 210, 212, 214, and 216 may execute instructions retrieved from the cache memories of chip 200. In doing so, the processor cores may use data stored in the cache memories of chip 200 and may write data resulting from the executing of the instructions into the cache memories. In one configuration, each processor core of chip 200 may execute instructions that are independent and/or different from instructions executed by the other processor cores of chip 200. For example, processor core 202 may execute a set of instructions (e.g., of a first application) and processor core 204 may independently execute a different set of instructions (e.g., or a second application). Alternatively, processor cores 202 and 204 may redundantly execute the same set of instructions, perhaps independent of each other, without interacting with each other in one embodiment.

I/O controllers 234, 238, 242, and 246 may facilitate communication between a processor core of chip 200 and a device external to chip 200 such as another processor or a voter (described further below). In one embodiment, two processor cores may share one I/O controller. For example, I/O controller 234 may communicate via interconnection circuitry 234 with both processor core 202 and processor core 204.

The modules of chip 200 may be associated with each other in a particular way. For example, processor core 202 may be associated with and/or may communicate with cache memory 218, memory controller 236, and I/O controller 234. Similarly, processor core 204 may be associated with cache memory 220, memory controller 236, and I/O controller 234; processor core 206 may be associated with cache memory 222, memory controller 240, and I/O controller 238; processor core 208 may be associated with cache memory 224, memory controller 240, and I/O controller 238; processor core 210 may be associated with cache memory 226, memory controller 244, and I/O controller 242; processor core 212 may be associated with cache memory 228, memory controller 244, and I/O controller 242; processor core 214 may be associated with cache memory 230, memory controller 248, and I/O controller 246; and processor core 216 may be associated with cache memory 232, memory controller 248, and I/O controller 246. In one embodiment, these associations may be reconfigurable.

Interconnection circuitry 234 may enable communication between the processor cores, cache memories, I/O controllers, and memory controllers of chip 200. As is depicted in FIG. 2, in one embodiment, interconnection circuitry 234 may be a ring 260. Other embodiments of interconnection circuitry 234 are also possible. For example, interconnection circuitry 234 may be a mesh or a cross bar.

Chip 200 may execute a plurality of applications simultaneously. For example, processor core 202, cache memory 218, memory controller 236, and I/O controller 234 may execute a first application and processor core 204, cache memory 220, memory controller 236, and I/O controller 234 may simultaneously execute a different second application. In one embodiment, chip 200 may execute applications non-redundantly. In other words, one of the processor cores of chip 200 may execute an application and other processor cores of chip 200 might not be used to execute the application.

In order to execute an application redundantly, in some embodiments the modules of chip 200 may be allocated among a plurality of fault domains. Fault domains may be defined and used to isolate groups of modules from each other so that faults occurring while executing an application in one fault domain are prevented from causing faults or errors to occur in another fault domain.

Referring to FIG. 2A, a configuration of chip 200 implementing two fault domains 262 and 264 is illustrated. Fault domain 262 includes the following modules of chip 200: processor cores 202, 204, 206, and 208; cache memories 218, 220, 222, and 224; I/O controllers 234 and 238; and memory controllers 236 and 240. In addition, fault domain 262 includes a ring 266 of interconnection circuitry 234. Ring 266 enables communication between the modules of fault domain 262 and, in this embodiment, may provide fault isolation between modules of fault domain 262 and modules of fault domain 264. For example, ring 266 may prevent direct communication between modules of fault domain 262 and modules of fault domain 264.

Fault domain 264 includes the following modules of chip 200: processor cores 210, 212, 214, and 216; cache memories 226, 228, 230, and 232; I/O controllers 242 and 246; and memory controllers 244 and 248. In addition, fault domain 264 includes a ring 268 of interconnection circuitry 234. Ring 268 enables communication between the modules of fault domain 264 and, in this embodiment, may provide fault isolation between modules of fault domain 264 and modules of fault domain 262.

Fault domain 262 may be isolated from fault domain 264 in that a failure of one of the modules associated with fault domain 262 (e.g., memory controller 236) may be prevented from affecting the modules associated with fault domain 264. In one embodiment, modules of fault domain 262 may be prevented from directly communicating with modules of fault domain 264.

In one embodiment, a single application may be redundantly executed in both fault domain 262 and fault domain 264, thereby providing dual mode redundancy. For example, processor core 202 may execute the application and processor core 210 may also execute the same application. More particularly, processor core 210 may execute the same instance of the application as processor core 202. Accordingly, processor core 210 and processor core 202 may redundantly execute instructions of the application and may do so in isolation from each other so that errors encountered while executing the application using processor core 210 (e.g., errors caused by radiation such as alpha particles) do not affect the redundant execution of the application performed by processor core 202.

At particular points in the execution, the results of executing the application on processor core 202 may be compared with results of executing the application on processor core 210. For example, processor core 202 may forward results of executing the application to I/O controller 234, which may forward the results to a voter 269. Similarly, processor core 210 may forward results of executing the application to I/O controller 242, which may forward the results to voter 269. Voter 269 may then compare the execution results from processor core 202 with the execution results from processor core 210.

If neither processor core 202 nor processor core 210 encountered an error while executing the application, the results of executing the application on processor core 202 should be the same as the results of executing the application on processor core 210. If the results are not the same, processing circuitry 12 may return processor core 202 and processor core 210 to a checkpoint in the application at which processor cores 202 and 210 had matching results and the application may be re-executed from the checkpoint.

In one embodiment, chip 200 may be configured to have more than two fault domains so that an application may be executed using triple mode redundancy within respective different fault domains. Alternatively, two or more processor cores of a single fault domain may redundantly execute the application.

Referring to FIG. 2B, a configuration of chip 200 implementing four fault domains 270, 272, 274, and 276 is illustrated. The modules of chip 200 are allocated among fault domains 270, 272, 274, and 276 as illustrated by FIG. 2B. Interconnection circuitry 234 may be configured to have four different rings 278, 280, 282, and 284. Ring 278 may enable communication between modules of fault domain 270 and may provide fault isolation between modules of fault domain 270 and modules of chip 200 belonging to other fault domains. Rings 280, 282, and 284 may similarly enable communication within their respective fault domains.

As was discussed above, fault domains 270, 272, 274, and 276 may be isolated from each other in that a failure occurring in one of the fault domains may be prevented from affecting the execution of an application in a different fault domain.

In one embodiment, modules of fault domain 270 may be used to execute a first application non-redundantly. Later, processing circuitry 12 may determine, based on one or more transition criteria, that the first application should be executed redundantly using triple mode redundancy. Consequently, the first application may be redundantly executed in fault domains 272, 274, and 276. In this configuration, processing circuitry 12 or a voter, such as voter 269, may detect an execution error made by one of the fault domains if execution results from the three fault domains do not match. If an error is detected, processing circuitry 12 may recover from the error by using an execution result that two of the three fault domains agree on.

Later, processing circuitry 12 may determine that the first application should be executed using dual mode redundancy. Consequently, the first application may be redundantly executed in fault domains 274 and 276. In this configuration, processing circuitry 12 may detect an execution error made by one of the fault domains if execution results from the two fault domains do not match. If an error is detected, the execution of the first application by fault domains 274 and 276 may be returned to a checkpoint and the first application may be re-executed by fault domains 274 and 276 from the checkpoint.

While chip 200 is executing the first application, chip 200 may be simultaneously executing other applications. For example, at one moment in time, processor cores 206, 210, and 214 may be redundantly executing the first application, processor cores 208 and 212 may be redundantly executing a second application, processor core 202 may be non-redundantly executing a third application, and processor core 204 may be non-redundantly executing a fourth application.

Referring to FIG. 3, a state diagram 300 depicting states of redundancy according to one embodiment is illustrated. In state 302, an application may be executed non-redundantly. For example, the application may be executed non-redundantly by one processor core (e.g., processor core 202 of fault domain 270). In state 304, the application may be redundantly executed using dual mode redundancy. For example, in state 304 the application may be simultaneously executed by two different processor cores (e.g., processor core 206 of fault domain 272 and processor core 210 of fault domain 274). Alternatively, in state 304 instructions of the application may be redundantly executed by sequentially executing the instructions twice using a single processor core.

In state 306, the application may be redundantly executed using triple mode redundancy. For example, in state 306 the application may be simultaneously executed by three different processor cores (e.g., processor core 206 of fault domain 272, processor core 210 of fault domain 274, and processor core 214 of fault domain 276). Alternatively, in state 306 instructions of the application may be redundantly executed by sequentially executing the instructions three times using a single processor core.

In one embodiment, processing circuitry 12 may configure chip 200 to execute an application using one of the states of FIG. 3. Processing circuitry 12 may subsequently evaluate one or more transition criteria while chip 200 is executing the application. In response to evaluating the transition criteria, processing circuitry 12 may configure chip 200 to execute the application using a different one of the states of FIG. 3. Consequently, during a single execution of the application, chip 200 may non-redundantly execute a first subset of the instructions of the application (e.g., when configured in state 302) and may redundantly execute a second subset of the instructions (e.g., when configured in state 304 or state 306) by executing the second subset of the instructions a first time, executing the second subset a second time, and comparing results of the two executions of the second subset of the instructions to determine whether an error occurred while executing the second subset of instructions the first time or the second time. If an error occurs, processing circuitry 12 may recover from the error (e.g., using forward error correction or by returning to a checkpoint). In one embodiment, instructions of the first subset might not belong to the second subset.

For example, processing circuitry 12 may configure chip 200 as illustrated in FIG. 2. Chip 200 may then execute an application in state 302 using processor core 202. Processing circuitry 12 may then evaluate one or more transition criteria and subsequently configure chip 200 as illustrated in FIG. 2A by allocating the modules of chip 200 among fault domains 262 and 264 as illustrated in FIG. 2A. Chip 200 may then execute the application in state 304 using processor cores 202 and 210. In one embodiment, processing circuitry 12 may configure chip 200 using the Advanced Configuration and Power Interface (ACPI) specification.

In contrast, in one embodiment, chip 200 may be configured as illustrated in FIG. 2B while executing in states 302, 304, and 306 of FIG. 3. In this embodiment, processing circuitry 12 may non-redundantly execute an application in state 302 using one or more modules of fault domain 270, may redundantly execute the application in state 304 using one or more modules of fault domain 272 and one or more modules of fault domain 274, and may redundantly execute the application in state 306 using one or more modules of fault domain 272, one or more modules of fault domain 274, and one or more modules of fault domain 276.

Figure 4:
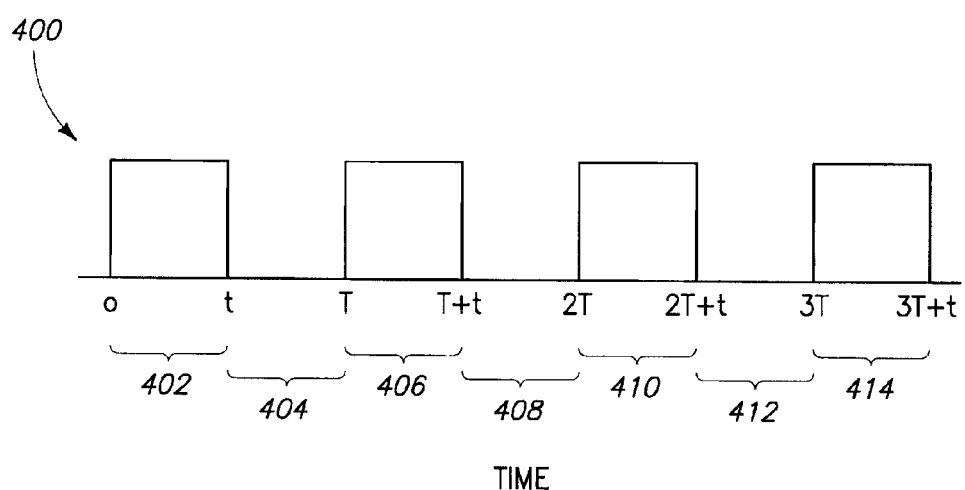
FIG. 4 is a timing diagram according to one embodiment.

Referring to FIG. 4, a timing diagram 400 is illustrated. Since a single execution of an application may take place in more than one of states 302, 304, and 306, the application may be redundantly executed during some portions of the single execution and non-redundantly executed during other portions of the single execution. Diagram 400 illustrates that in one embodiment the application may be redundantly executed in state 304 during periods 402, 406, 410, and 414. Diagram 400 also illustrates the application may be non-redundantly executed in state 302 during periods 404, 408, and 412.

Diagram 400 may be used to determine a percentage of time during which the application is executed redundantly and a percentage of time during which the application is executed non-redundantly. For example, based on diagram 400, the percentage of time the application is executed redundantly may be expressed as a variable x where $x=(t*100)/T$ and the percentage of time the application is executed non-redundantly may be expressed as $100\%-x$. By way of example, if $t=10$ and $T=100$ then $x=10\%$. Furthermore, a duty cycle for FIG. 4 may be expressed as $D=t/T$. The duty cycle may be altered during the course of executing an application.

Downtime of the application while being executed redundantly may be expressed as a variable DR and down time of the application while being executed non-redundantly may be expressed as a variable DNR. In some embodiments, DR may be significantly smaller than DNR since downtime may be less likely when executing an application redundantly. An availability of the application may be expressed as a variable w where $w=100-DR-DNR$. In some cases, the availability (w) of the application may be used to determine whether the execution of the application is within parameters of a service level agreement (SLA), as is discussed further below.

By way of example, using $x=10\%$, DR may be calculated using the formula $DR=y\%$ of x. By way of example, if $y=1\%$ and $x=10\%$ then $DR=0.1\%$. DNR may be calculated using the formula $DNR=z\%$ of $(100-x)$. If $z=10\%$, $DNR=10*(100-10)/100=0.9\%$. A system unavailability may be expressed as DR+DNR, which, using the example numbers above results in a system unavailability of $0.1\%+0.9\%=1\%$ and a system availability (w) of $100\%-1\%=99\%$.

Although the amount of time the application is executed redundantly is illustrated as being periodic in FIG. 4, in general, the amount of time the application is executed redundantly might not be periodic.

As mentioned above, processing circuitry 12 may transition the application from a first degree of redundancy (e.g., one of the states of FIG. 3) to a different degree of redundancy (e.g., a different one of the states of FIG. 3) based on evaluating one or more transition criteria. For example, in one embodiment, processing circuitry 12 may transition the application if any one of a plurality of transition criteria are satisfied. In another embodiment, processing circuitry 12 may transition the application if two or more of the transition criteria are satisfied. Different combinations of transition criteria are possible.

Some transition criteria may be related to characteristics of chip 200. In one embodiment, a first transition criterion may be related to load characteristics of one or more of the processor cores of chip 200. In one embodiment, the load characteristic of a processor core may be related to a number of applications executing by or waiting to be executed by the processor core during a recently expired period of time.

For example, at a point in time processing circuitry 12 may determine a load characteristic evaluated during a period of the 5 minutes immediately prior to the point of time for each of the processor cores of chip 200. If one or more of the load values are above a threshold, processing circuitry 12 may conclude that chip 200 is currently heavily loaded and that processing circuitry 12 should not configure chip 200 to execute applications redundantly since doing so may reduce the number of applications that chip 200 is able to execute because some modules of chip 200 will be redundantly executing a same single application rather than independently executing two or more different applications.

In one embodiment, another transition criterion may be related to availability characteristics of one or more of the modules of chip 200. In one embodiment, the availability characteristic of a module may be related to whether or not the module is operational. If the module is operational, it may be available to process instructions. However, if the module is non-operational, it might not be available to process instructions. Modules of chip 200 may become non-operational over time, for example, due to wear out. Alternatively, some modules of chip 200 may become non-operational with respect to a first virtual machine of a virtualized environment if the modules are allocated to a second virtual machine of the virtualized environment.

Processing circuitry 12 may determine how many of the modules of chip 200 are unavailable. In one configuration, processing circuitry 12 may compare the number of unavailable modules to a threshold. If the number exceeds the threshold, processing circuitry 12 may configure chip 200 to execute applications non-redundantly because chip 200 may have reduced capacity due to the unavailable modules. If previously unavailable modules later become available, processing circuitry 12 may determine that the number of unavailable modules is now below the threshold and may therefore configure chip 200 to execute one or more applications redundantly due to the increased capacity of chip 200.

In one embodiment, another transition criterion may be related to an error rate of one or more of the processor cores of chip 200. In one embodiment, the error rate of a processor core may be related to a number of soft errors (e.g., errors induced by radiation such as alpha particles) experienced by the processor core. In some cases, the error rate may be related to an elevation above sea level of a chip 200 since radiation induced errors may increase as elevation above sea level increases.

For example, processing circuitry 12 may determine an ambient error rate for one or more of the processor cores of chip 200. If one or more of the error rates are above a threshold, processing circuitry 12 may subsequently configure chip 200 to redundantly execute applications (e.g., by executing the applications in states 304 or 306, but not in state 302) in order to detect and correct errors made by the processor cores.

In one embodiment, another transition criterion may be related to a power supply providing power to chip 200. For example, if chip 200 is powered by a battery, processing circuitry 12 may configure chip 200 to execute applications non-redundantly in order to conserve power. Executing an application non-redundantly may consume less power than executing the application redundantly since the application may be executed more than once when executed redundantly. Consequently, processing circuitry 12 may monitor a power supply to detect changes in the power supply. If chip 200 is powered by mains power but then the mains power is disconnected and chip 200 is subsequently powered by a battery, processing circuitry 12 may configure chip 200 to non-redundantly execute applications (e.g., by executing the applications using state 302) in response to detecting the change in power supplies. Similarly, if chip 200 is powered by a battery but then mains power is connected and chip 200 is subsequently powered by mains power, processing circuitry 12 may configure chip 200 to redundantly execute applications in response to detecting the change in power supplies.

Other transition criteria may be related to the application itself. In one embodiment, such transition criterion may be related to an error sensitivity characteristic of the application. The application may comprise a plurality of instructions and subsets of the instructions may have different error sensitivity characteristics. Evaluating the transition criterion may involve determining an error sensitivity characteristic of a subset of the instructions prior to executing the subset of instructions.

For example, if the application is a banking application, a particular subset of the instructions of the application may involve updating an account balance. To ensure accuracy while updating the account balance, the subset of the instructions used to update the account balance may have an error sensitivity characteristic indicating that the particular subset of the instructions is highly sensitive to errors. Upon determining that the particular subset is highly sensitive to errors, processing circuitry 12 may configure chip 200 to redundantly execute the particular subset (e.g., by executing the particular subset in state 304 or state 306) in order to remedy any error that may occur while executing the particular subset. Other subsets of the instructions that do not involve updating an account balance may have an error sensitivity characteristic indicating a low sensitivity to errors. Accordingly, processing circuitry 12 may configure chip 200 to non-redundantly execute the other subsets (e.g., by executing the other subsets in state 302).

In one embodiment, another transition criterion may be related to a delay sensitivity characteristic of the application. The application may comprise a plurality of instructions and subsets of the instructions may have different delay sensitivity characteristics. Evaluating the transition criterion may involve determining a delay sensitivity characteristic of a subset of the instructions prior to executing the subset of instructions.

For example, if the application is a real-time communications application (e.g., an audio or video communications application), a particular subset of the instructions of the application may involve encoding communication information. To avoid delay while encoding the communication information, the subset of the instructions used to encode the communication information may have a delay sensitivity characteristic indicating that the particular subset of the instructions is highly sensitive to delay. Upon determining that the particular subset is highly sensitive to delay, processing circuitry 12 may configure chip 200 to redundantly execute the particular subset using triple mode redundancy (e.g. by configuring chip 200 in state 306) so that if errors are detected while executing the particular subset, the errors may be corrected using forward error recovery as was described above. Using triple mode redundancy may be preferable to dual mode redundancy in this case since correcting an error using dual mode redundancy may involve backing up the application to a checkpoint and re-executing the application from the checkpoint, which may introduce a significant delay not incurred when using triple mode redundancy and forward error recovery.

Other subsets of the instructions that do not involve encoding communication information may have a delay sensitivity characteristic indicating a low sensitivity to delay. Accordingly, processing circuitry 12 may configure chip 200 to non-redundantly execute these subsets of instructions (e.g., by configuring chip 200 in state 302).

In one embodiment, another transition criterion may be related to a time of day characteristic of the application. For example, the application may have a characteristic specifying that during a particular period of time the application is to be executed redundantly. The particular period of time may, in one embodiment, be a particular portion of a day, for example, a portion of the day during which a backup operation is performed. In one embodiment, the particular period of time may span a time period during which particularly sensitive information may be processed by the application.

Processing circuitry 12 may, in one embodiment, compare a current date and/or time with the particular period of time. If the current date and/or time falls within the particular period and chip 200 is currently executing the application non-redundantly, processing circuitry 12 may configure chip 200 to execute the application redundantly (e.g., by configuring chip 200 to execute the application in state 304 or state 306). If the current date and/or time does not fall within the particular period and chip 200 is currently executing the application redundantly, processing circuitry 12 may configure chip 200 to execute the application non-redundantly (e.g., by configuring chip 200 to execute the application in state 302).

In one embodiment, another transition criterion may be related to a service level agreement (SLA) of the application. The SLA may specify that the application is to have an availability at least equal to an availability requirement. Processing circuitry 12 may calculate the availability of the application based on amounts of time the application is redundantly executed and amounts of time the application is non-redundantly executed as was described above in relation to FIG. 4. Processing circuitry 12 may determine that the application should be executed redundantly if the current availability is below or approaching the availability requirement. In response to the determining, processing circuitry 12 may configure chip 200 to execute the application redundantly to ensure that the availability requirement of the service level agreement is met.

Referring to FIG. 5, a method 500 of executing an application is illustrated.

At 502, processing circuitry 12 may initially execute an application using a redundancy state (e.g., one of states 302, 304, or 306) defined by a service level agreement (SLA).

At 504, processing circuitry 12 may determine the current availability of the application using the methods described above in relation to FIG. 4.

At 506, processing circuitry 12 may evaluate one or more transition criteria such as the transition criteria described above.

In response to evaluating the one or more transition criteria, processing circuitry 12 may determine that execution of the application should continue in the current state using the same degree of redundancy. Accordingly, at 508, processing circuitry 12 might not change the degree of redundancy of the execution of the application.

Alternatively, in response to evaluating the one or more transition criteria, processing circuitry 12 may determine that execution of the application should be altered so that the application is subsequently executed using a different degree of redundancy. Accordingly, at 510, processing circuitry 12 may change the degree of redundancy with which the application is executed.

The protection sought is not to be limited to the disclosed embodiments, which are given by way of example only, but instead is to be limited only by the scope of the appended claims.

Further, aspects herein have been presented for guidance in construction and/or operation of illustrative embodiments of the disclosure. Applicant(s) hereof consider these described illustrative embodiments to also include, disclose and describe further inventive aspects in addition to those explicitly disclosed. For example, the additional inventive aspects may include less, more and/or alternative features than those described in the illustrative embodiments. In more specific examples, Applicants consider the disclosure to include, disclose and describe methods which include less, more and/or alternative steps than those methods explicitly disclosed as well as apparatus which includes less, more and/or alternative structure than the explicitly disclosed structure.

What is claimed is:

1. A processor operating method comprising:
executing an application using a first number of a plurality of processor cores;
evaluating a first transition criterion based on a characteristic of the application while the application is executed using the first number of the plurality of processor cores; and
after the evaluating, redundantly executing the application using a second number of the plurality of processor cores.

2. The method of claim 1 wherein the method includes evaluating a second transition criterion based on a characteristic of the plurality of processor cores.

3. The method of claim 1 wherein the application comprises a plurality of instructions and the evaluating the first transition criterion comprises determining a delay sensitivity characteristic of a subset of the plurality of instructions and the executing the application using the second number of the plurality of processor cores comprises executing the subset of the plurality of instructions.

4. The method of claim 1 wherein the application comprises a plurality of instructions and the evaluating the first transition criterion comprises determining an error sensitivity characteristic of a subset of the plurality of instructions and the executing the application using the second number comprises executing the subset of the plurality of instructions.

5. The method of claim 1 wherein the evaluating the first transition criterion comprises comparing a current date and/or time with a date and/or time during which the application is to be executed using more than one processor core of the plurality.

6. A processor operating method comprising:
performing a single execution of an application, the application comprising a plurality of instructions;
during the performing of the single execution of the application, non-redundantly executing a first subset of the instructions of the plurality;
during the performing of the single execution of the application, executing a second subset of the instructions of the plurality a first time;
during the performing of the single execution of the application, redundantly executing the second subset of the instructions of the plurality a second time; and
comparing results of the executing of the second subset the first time with results of the executing of the second subset the second time.

7. The method of claim 6 further comprising:
based on the comparing, determining whether an error occurred during the executing of the second subset of the instructions the first time or the executing of the second subset of the instructions the second time; and
if the error occurred, recovering from the error.

8. The method of claim 6 wherein the executing the second subset the first time comprises executing the second subset using at least a first processor core and the executing the second subset the second time comprises executing the second subset using at least a second processor core, the first processor core being physically distinct from the second processor core.

9. The method of claim 6 wherein the executing the second subset of the instructions the first time and the executing the second subset of the instructions the second time occur substantially simultaneously.

10. The method of claim 6 wherein the executing the second subset of the instructions the second time occurs subsequent to the executing the second subset of the instructions the first time.

11. The method of claim 6 further comprising redundantly executing the second subset of the instructions of the plurality a third time and wherein the comparing comprises comparing the results of the executing the first time with the results of the executing the second time and results of the executing the third time.

12. The method of claim 6 further comprising, subsequent to the comparing and during the performing of the single execution of the application, periodically transitioning from executing the application non-redundantly to executing the application redundantly and periodically transitioning from executing the application redundantly to executing the application non-redundantly.

13. An integrated circuit comprising:
a plurality of processor cores; and
processing circuitry configured to:
configure a first number of the plurality of processor cores to execute an application;
evaluate a first transition criterion based on a characteristic of the application while the first number of the plurality of processor cores are executing the application; and
in response to evaluating the first transition criterion, configure a second number of the plurality of processor cores to redundantly execute the application.

14. The integrated circuit of claim 13 wherein the processing circuitry is configured to evaluate the first transition criterion while the first number of the plurality are executing the application.

15. The integrated circuit of claim 13 wherein at least one of the processor cores of the plurality comprises the processing circuitry.

16. The integrated circuit of claim 13 wherein one of the first number of processor cores and the second number of processor cores is greater than one and the other of the first number of processor cores and the second number of processor cores is one.

17. The integrated circuit of claim 13 wherein the integrated circuit is a single monolithic integrated circuit and the processing circuitry is further configured to, after the evaluating, reconfigure the integrated circuit so that a first subset of the processor cores of the plurality are allocated to a first fault domain and a second subset of the processor cores of the plurality are allocated to a second fault domain, wherein processor cores of the first subset are fault isolated from processor cores of the second subset while executing the application and one or more of the second number of the plurality of processor cores belongs to the first subset and one or more of the second number of the plurality of processor cores belongs to the second subset.

18. The integrated circuit of claim 13 wherein the processing circuitry is configured to evaluate a second transition criterion comprising comparing an ambient error rate of one or more of the processor cores to an error rate threshold.

19. The integrated circuit of claim 13 wherein the processing circuitry is configured to evaluate a third transition criterion comprising analyzing the plurality of processor cores to determine how many of the plurality are currently available to process instructions.

* * * * *